Jan. 13, 1948.  B. D. LANDES  2,434,362
DEVICE FOR ATTACHING ANTISKID CHAINS TO VEHICLE WHEELS
Filed Jan. 29, 1946  2 Sheets-Sheet 1
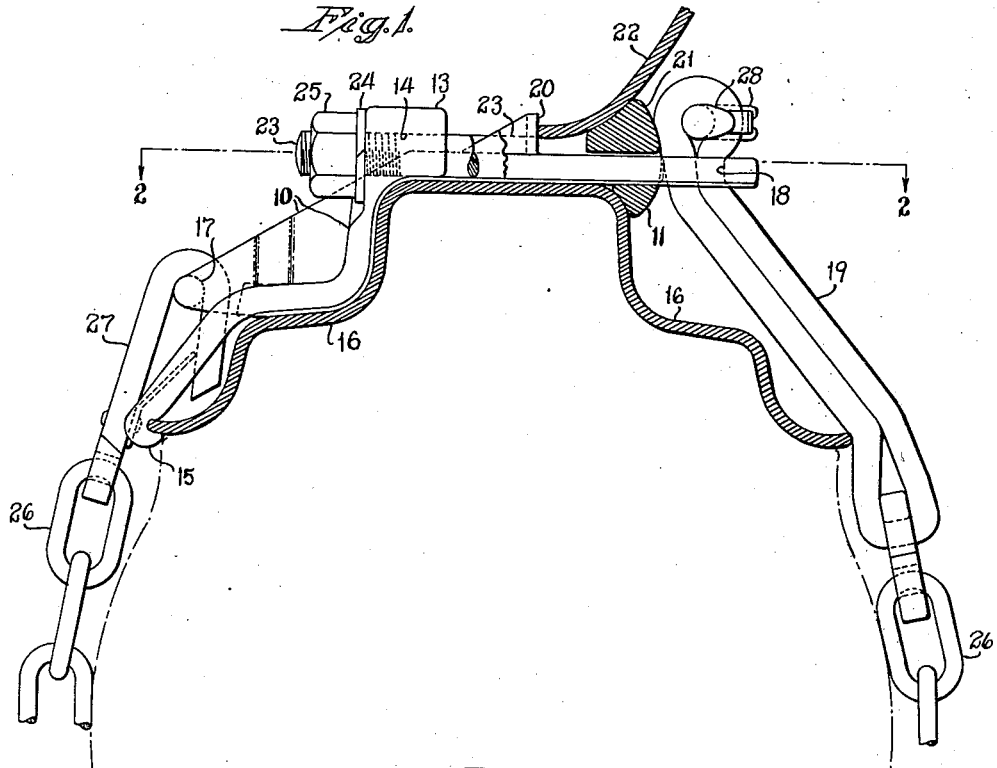
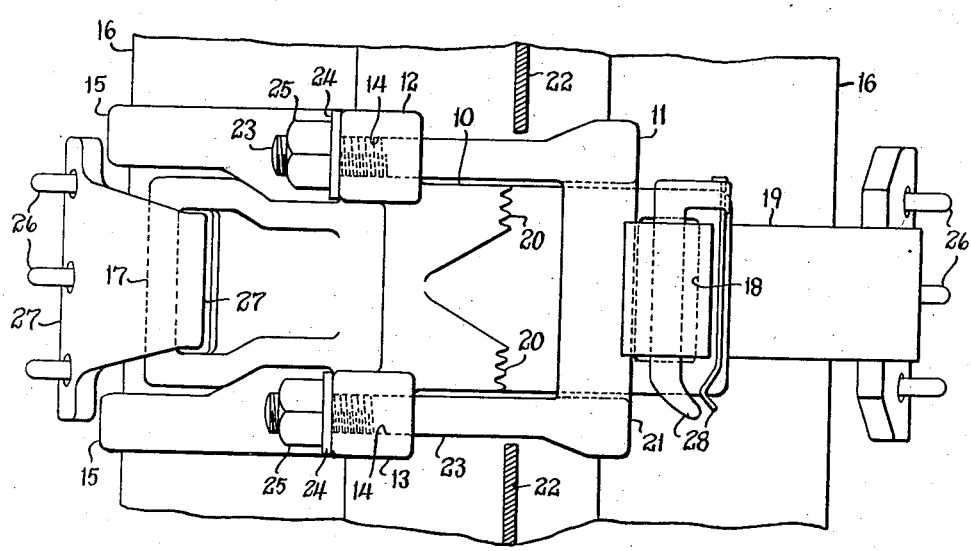
Inventor
Benjamin D. Landes
By Seymour Earle & Nichol
Attorneys Jan. 13, 1948.     B. D. LANDES     2,434,362
DEVICE FOR ATTACHING ANTISKID CHAINS TO VEHICLE WHEELS
Filed Jan. 29, 1946     2 Sheets-Sheet 2
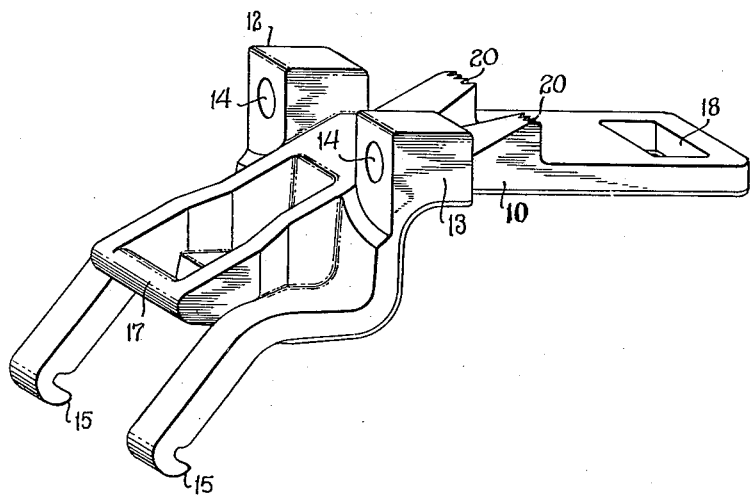
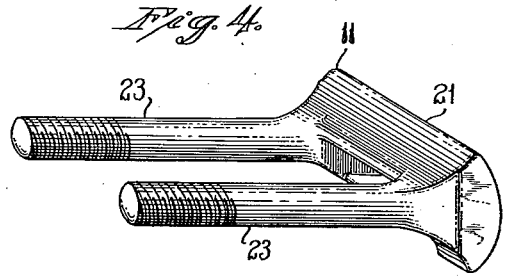
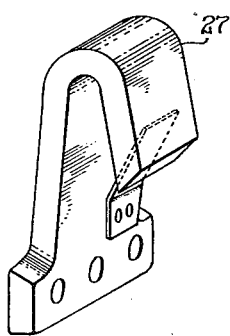
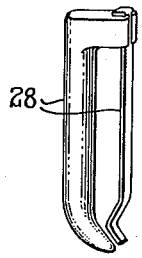
Inventor
Benjamin D. Landes
By Seymour Earle & Nichols
Attorneys Patented Jan. 13, 1948

2,434,362

UNITED STATES PATENT OFFICE 2,434,362

DEVICE FOR ATTACHING ANTISKID CHAINS TO VEHICLE WHEELS

Benjamin D. Landes, Middletown, R. I.

Application January 29, 1946, Serial No. 644,059

2 Claims. (Cl. 152—237)

This invention relates to devices for attaching anti-skid chains to vehicle wheels.

One object of my invention is to provide means adapted to be secured to the rims of vehicle wheels to which anti-skid chains may be readily connected or disconnected.

Another object of this invention is to provide means which may be secured to wheel-rims and remain in position, whether the anti-skid chains are in use or not.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a view partly in section of an anti-skid bracket and chain applied to a wheel-rim;

Fig. 2 is a sectional view on the line 2—2 of Fig. 1;

Fig. 3 is a perspective view of the body-member of the clamping- or rim-bracket;

Fig. 4 is a perspective view of the wedge-yoke, detached;

Fig. 5 is a perspective view of a chain-hook to be attached to one end of the clamping- or rim-bracket; and Fig. 6 is a perspective view of a clip for connecting the other end of the chain to the clamping- or rim-bracket.

In carrying out my invention, I employ a clamping- or rim-bracket consisting of a body-member 10 and a wedge-yoke 11. The said body-member has two wedge-blocks 12 and 13 which are each formed with a hole 14, two hooks 15 adapted to engage with the edges of a wheel-rim 16, a chain-engaging bar 17, a slot 18 for the passage of a chain-loop 19, and serrated stops 20 for contact with the inner edge of the dished portion of the wheel and serving to prevent the bracket from slipping out of position when a load is applied. The wedge-yoke 11 has a head 21 to enter between the wheel-disk 22 and the wheel-rim 16, two threaded shanks 23 to pass through the holes 14 and receive washers 24 and nuts 25.

Connected with the end-links of the anti-skid chains 26 is a hook 27 adapted to engage with the chain-bar 17.

The loop 19 is connected with the other ends of the anti-skid chains and is preferably of flexible material which is passed through the slot 18 and held against withdrawal by a spring-clip 28.

Removal of the chain is accomplished easily by slipping the spring-clip out of the loop, pulling the loop out of the slot and then unhooking the inner end hook.

One or more sets, each consisting of one rim-bracket and one wedge-yoke, along with the necessary nuts and lock-washers or their equivalent, may be applied or attached to each wheel of a motor vehicle and left in place at all times or only during those seasons of the year when the use of anti-skid chains is necessary. It is considered desirable to have either two or four sets per wheel so located as to permit proper dynamic balance of the wheel to be maintained.

To protect the painted surfaces of the dished portion and rim of the wheel that would be in direct contact with the surfaces of the rim-bracket and the wedge-yoke or holding-wedge, a thin layer of rubber or other material is inserted between those surfaces when the rim-bracket and wedge-yoke or holding-wedge are assembled on the wheel.

The bracket and wedge are adapted to be used for attaching so-called "emergency chains," as well as for attaching a complete set of anti-skid tire-chains.

It is obvious, without further illustration, that the loop 19 might be connected by other means without departing from my invention.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A bracket for attaching anti-skid chains to vehicle wheels, said bracket comprising an apertured body-member mounted on one side of said wheel; a wedge-member mounted on the opposite side of said wheel, said wedge-member having an element arranged to engage in the aperture of said body-member; adjustable-means on said wedge-element to secure said wedge-element in the aperture of said body-member; and means on said body-member to connect the opposite ends of said anti-skid chains thereto.

2. A bracket for attaching anti-skid chains to disked wheels, said bracket comprising a body-member having a rim-hook arranged to engage the edge of the wheel-rim; an apertured tongue arranged to extend across the rim of said wheel to the opposite side thereof and a lug on said tongue arranged to engage the inner periphery of said wheel-disk; a wedge-member slidably supported on said tongue-portion on the said opposite side of said wheel, said wedge-member having a head-portion; fastening-means arranged to secure said wedge-member in an adjusted position on said tongue-portion so as to wedge the head-portion of said wedge-member between the outer periphery of the rim and disk of said wheel; a chain-hook on said body-member for connecting one end of said anti-skid chain thereto; and a chain-loop on the opposite end of said chain arranged to be connected in the aperture of said tongue to secure the opposite end of said anti-skid chain thereto.

BENJAMIN D. LANDES.

REFERENCES CITED

The following references are of record in the file of this patent:

UNITED STATES PATENTS

| Number | Name | Date |
| --- | --- | --- |
| 1,536,362 | Traner et al. | May 5, 1925 |
| 2,275,834 | Alexander | Mar. 10, 1942 |
| 2,417,752 | Hayes | Mar. 18, 1947 |